United States Patent
Moore et al.

[11] Patent Number: 5,934,226
[45] Date of Patent: Aug. 10, 1999

[54] BIRD DIAPER

[76] Inventors: Lorraine Moore; Mark Moore, both of 217 S. Glen Ave., Watkins Glen, N.Y. 14891; Cely Giron, 9388 Sawtooth Way, San Diego, Calif. 92129

[21] Appl. No.: 08/951,171

[22] Filed: Oct. 15, 1997

Related U.S. Application Data

[60] Provisional application No. 60/029,142, Oct. 21, 1996.

[51] Int. Cl.⁶ ................................................. A01K 23/00
[52] U.S. Cl. ........................................... 119/868; 119/853
[58] Field of Search ................................... 119/714, 853, 119/868

[56] References Cited

U.S. PATENT DOCUMENTS

| | | | |
|---|---|---|---|
| 1,949,004 | 2/1934 | Boardman | 119/853 |
| 2,190,115 | 2/1940 | Fuqua . | |
| 2,703,553 | 3/1955 | Cooke . | |
| 2,882,858 | 4/1959 | Dlugi | 119/868 |
| 4,353,330 | 10/1982 | Baumgartner | 119/868 |
| 5,218,928 | 6/1993 | Muck et al. | 119/714 |

FOREIGN PATENT DOCUMENTS

| | | |
|---|---|---|
| 672569 | 10/1963 | Canada . |
| 943116 | 11/1963 | United Kingdom . |
| 981247 | 1/1965 | United Kingdom . |

OTHER PUBLICATIONS

Penny Ward Moser, "Dreams, Schemes, and 3,300 Better Mousetraps," *Discover*, p. 85, Dec. 1985.

*Primary Examiner*—Robert P. Swiatek
*Attorney, Agent, or Firm*—Richard C. Litman

[57] ABSTRACT

A bird diaper for an uncaged pet bird to wear, featuring an enclosed pouch for receiving and containing excrement, and apertures to accommodate both the wings and the tail of the bird. Elastic straps and hook and loop fastener components (e.g., VELCRO) secure the diaper onto the body of the pet bird without restricting movement. The bird diaper is fabricated from spandex (e.g., LYCRA) or another stretchable, lightweight material, allowing absorption of bird excrement to prevent leaks and facilitating easy cleaning using soap and water. The bird diaper can incorporate decorative designs, bright colors and is available in different sizes. The bird diaper also has a leash which is insertable within the hook and loop fasteners. The leash serves to restrain or limit the bird's area of free flight.

18 Claims, 7 Drawing Sheets

BIRD DIAPER

CROSS REFERENCE TO RELATED APPLICATIONS

This application claim the benefit of U.S. Provisional Application Serial No. 60/029,142 filed Oct. 21, 1996.

BACKGROUND OF THE INVENTION

1. Field of the Invention

The present invention relates to wearable pet appliances and, more particularly, to wearable pet appliances with sanitary, protective, and restraint applications for pet birds.

2. Description of the Related Art

Humans have always kept and enjoyed animals as pets. The domestication of animals as pets entails dual responsibilities that inevitable involve the handling of excrement and protective restraint of birds. Furthermore, pet owners must protect dwellings and belongings from being soiled by pet excrement, as sanitary considerations exist.

The mobility of a domesticated animals necessitate wearable sanitary garments in many situations, especially where it is difficult to protect dwellings and belongings. A problem for female dog owners when the dog is "in heat" and subject to reproductive advances from male dogs involves the well-known unpleasant vaginal discharges that threaten dwellings and belongings. U.S. Pat. No. 2,190,115 and British Patent 943,116 disclose wearable protective sanitary harness devices for pets that aim to solve this problem.

Pet birds comprise a special class of domesticated animals whose ability to fly and walk pose unique sanitary problems. In the past, the increased degrees of freedom associated with pet birds have warranted caging them for sanitary and protective reasons. However, keeping a pet bird in a cage, while allowing for the containment of excrement, severely limits the pleasure inherent in pet ownership. U.S. Pat. No. 2,703,553 and 5,218,928 disclose wearable restraining devices that permit the uncaging of pet birds. Unfortunately, neither of these inventions further address the sanitary concerns associated with allowing pet birds to spend time uncaged, wherein excremental discharges threaten dwellings and belongings of pet owners.

Seeking to solve this problem, U.S. Pat. No. 2,882,858 discloses a sanitary appliance for pet birds that collects excrement from the vent of the bird, thereby preventing soiling of the dwellings and belongings of the owner. When worn by the bird, a triangular piece of fabric covers the vent, and is secured by tape strips along the tail and breast of the bird. Both tape strips terminate at a collar that encircles the neck of the bird, and the device incorporates snap closure means at two points.

However, given the tendency of pet birds to wriggle, writhe and peck when handled, a pet bird owner would face difficulties in actuating both snap closures to secure the sanitary appliance onto the bird. Additionally, since birds have a natural curiosity for metal devices accessible to their reach, given the strength of their beaks, it is likely they would bite off or destroy the snaps. Furthermore, the utilitarian construction obviates the constraining nature of this device, compromising the attractive plumage of the pet bird.

Another shortcoming associated with the device disclosed by U.S. Pat. No. 2,882,858 involves the collar encircling the neck of the bird, to which the tape strips connect. The confinement that the collar imposes restricts the neck and the head motion of the bird. In addition, the plurality of strips securing the device increase the likelihood of self-imposed harm, should the strips entangle with or catch onto some object that the bird encounters when moving about the dwelling of the owner.

None of the above inventions and patents, taken either singularly or in combination, is seen to describe the instant invention as claimed. Thus a bird diaper solving the aforementioned problems is desired.

SUMMARY OF THE INVENTION

The present invention is a sanitary apparatus configured for a pet bird to wear. The sanitary apparatus, otherwise referred to as a bird diaper, is formed from a stretchable and absorbent material. The bird diaper covers a bird's chest, back, urogenital area and anus. The bird diaper also a pair of openings for the bird's wings and legs and an aperture for the bird's tailfeathers. The bird diaper is thus configured to allow the pet bird to freely fly around the owner's house while protecting the bird owner's property from falling excrement.

Although the bird diaper may be made from any number of pieces, the bird diaper generally comprises three pieces of stretchable material, configured for a pet bird to wear. The bird diaper has a front piece with a substantially rectangular top part and an elongated, rounded bottom part. Two other pieces of stretchable material connect to form the back side of the bird diaper. Each back piece has a substantially rectangular top part and a substantially semi-circular bottom part so that the back pieces are substantially mirror images of each other. Hook and loop fastener (e.g., VELCRO) components secure the back pieces together. The bottom parts of the back pieces are stitched together permanently to form a substantially circular opening.

The bottom parts of the front and back pieces are connected along the sides and bottom, forming an enclosed pouch for receiving and containing excrement. Elastic straps connect the top of the front piece to the tops of the back pieces.

A pet owner applying the bird diaper places it between the legs of the pet bird, and inserts both legs into the substantially elliptical openings formed by the elastic straps and the pieces of material. The pet owner then stretches the elastic straps over the wings of the bird and pulls the bird diaper closer to the bird, so that the inner surface of the front piece contacts the breast of the bird. The pet bird owner secures the pouch under the excretory organs of the pet bird, to receive and to contain both feces and urine. The elongated shape of the pouch prevents excrement from touching the bird. After positioning the pouch, the pet bird owner can insert the tail of the bird through the substantially circular opening.

To secure the bird diaper on the body of the pet bird, the bird owner folds the back pieces down on top of each other, so that the hook and loop fastener components contact.

The bird diaper is fabricated from SPANDEX (e.g., LYCRA) or another stretchable, lightweight material, allowing absorption of bird excrement to prevent leaks and facilitating easy cleaning using soap and water. The bird diaper can incorporate decorative designs and bright colors. Furthermore, the non-restrictive design of the bird diaper allows the bird to move freely.

In addition, the bird diaper can be moistened before application to cool the pet bird during summer months. Alternatively, the bird diaper can be utilized to keep the pet bird warm during winter months. To accommodate different types of pet birds, the bird diaper will be available in different sizes.

Accordingly, it is a principal object of the invention to provide means for receiving and containing pet bird excrement while the pet bird is uncaged.

It is another object of the invention to protect the dwellings and belongings of pet bird owners from being soiled by pet bird excrement.

Yet another object of the invention is to provide a sanitary appliance for pet birds that can be secured onto and removed from a pet bird easily.

It is a further object of the invention to provide a wearable device for birds for the collection of bird excrement without inhibiting the free movement of the bird, or causing it to be in contact with the excrement.

Still another object of the invention is to use material that is lightweight, stretchable, absorptive, easy to clean, possesses cooling and insulating properties and allows a variety of possible colors, designs and sizes.

Another object of the invention is to provide a device which restrains the free flight of a pet bird.

It is an object of the invention to provide improved elements and arrangements thereof in a bird diaper for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
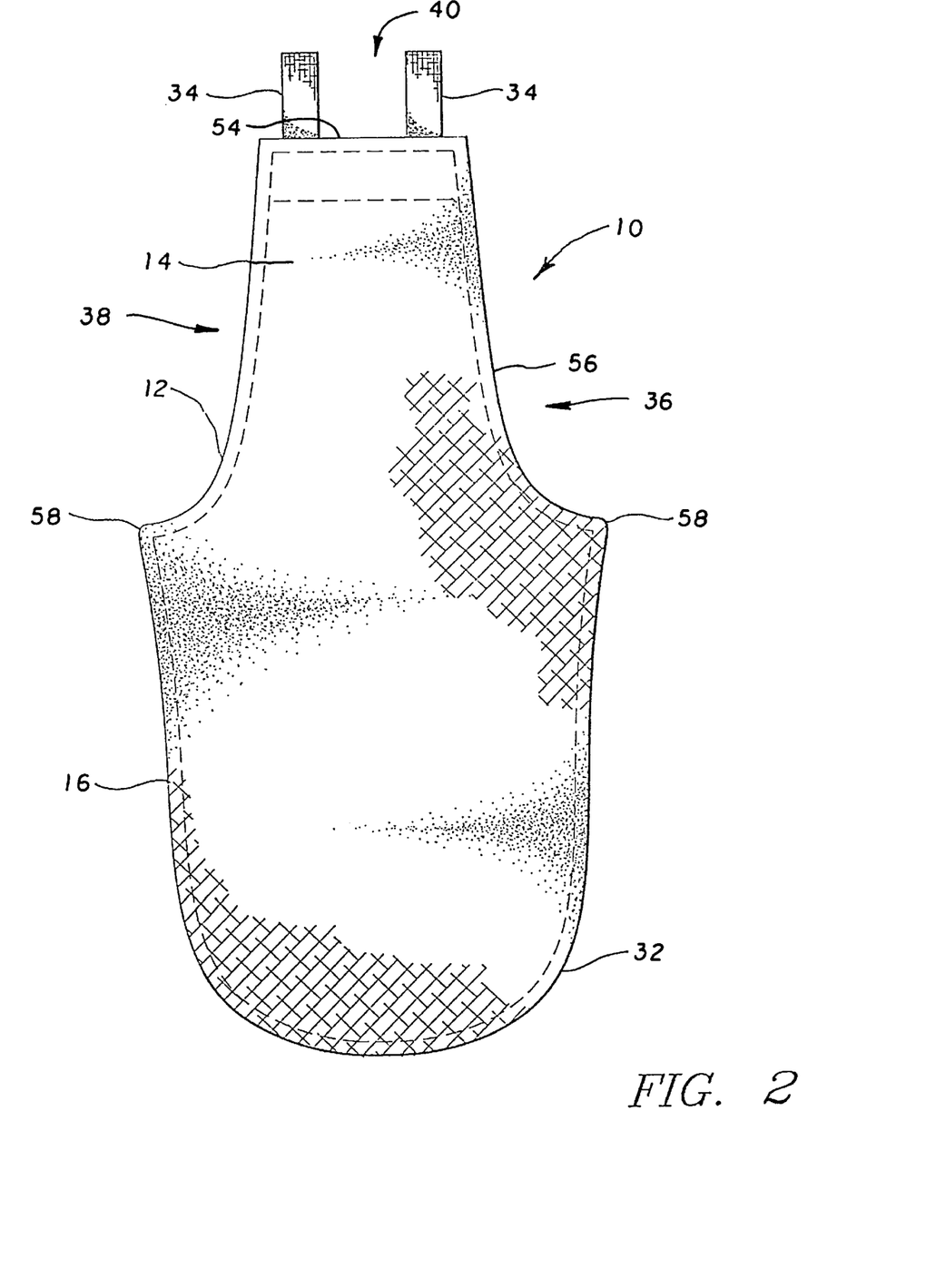
FIG. 2 is a front view of the bird diaper according to the invention of FIG. 1.
Figure 4:
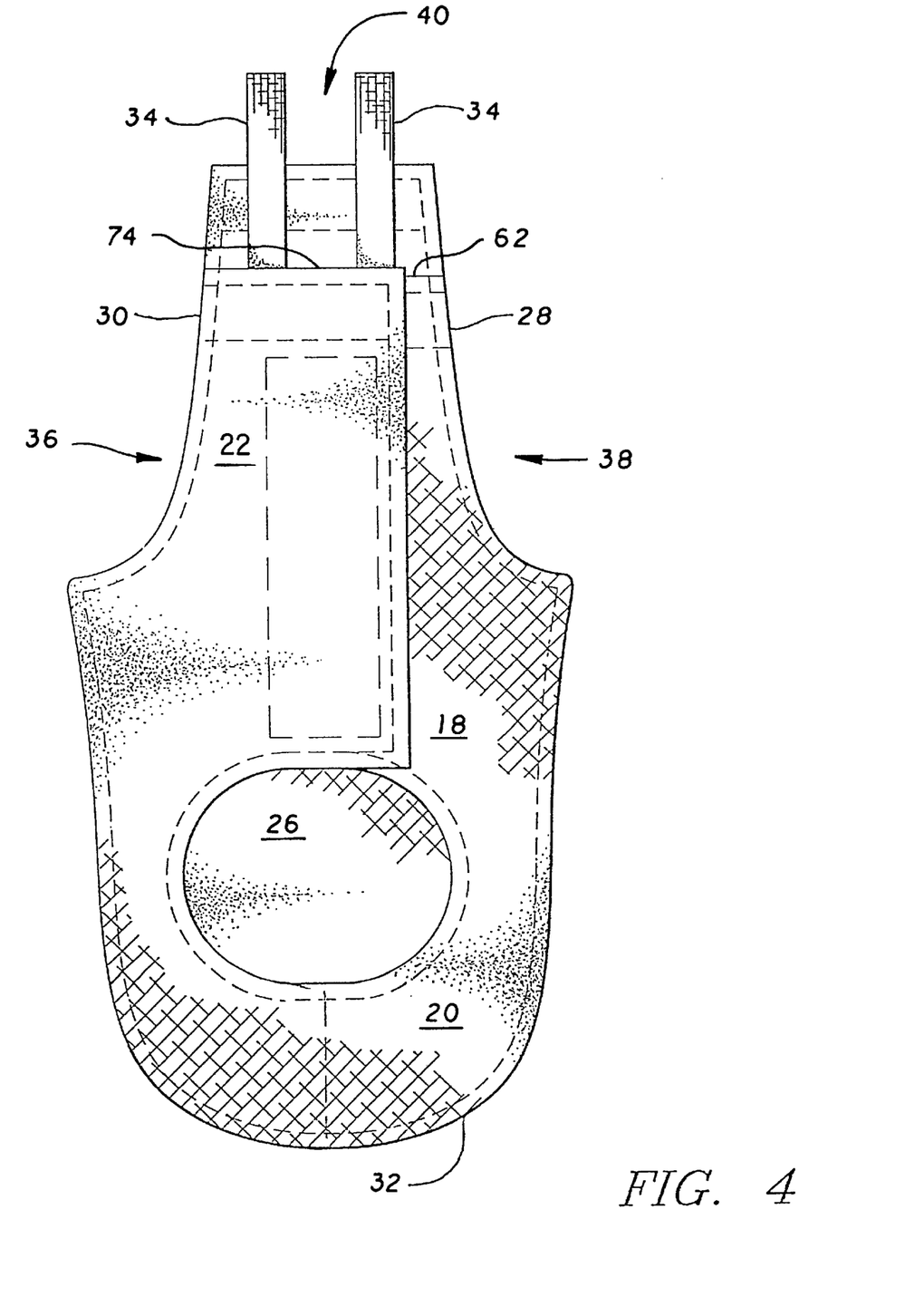
FIG. 4 is a rear view of the bird diaper according to the invention of FIG. 1, in a closed position.

The present invention is a sanitary apparatus sized to fit a pet bird 100. Generally referred to as a bird diaper 10, the present invention comprises a front section of fabric 12, as seen in FIG. 2, having a top surface 14 and a bottom surface 16, and a back section of fabric 18, as illustrated in FIG. 4, which also has a top surface 22 and a bottom surface 20. The bottom surfaces 16 and 20 of both the back section of fabric 18 and the front section of fabric 12 are connected to each other. It is preferred that the sections 12 and 18 are connected to one another by stitching.

A pouch 32 is formed from the interconnection of the front section of fabric 12 and the back section of fabric 18. The pouch 32 is suited for receiving fecal matter and excrement from the bird 100 therein. The pouch 32 is sized so that the bird's 100 excrement does not come in contact with the bird 100. Additionally, an absorbent pad 33 is affixed to the pouch 32.

Referring again to the back section of fabric 18, the back section 18 contains an aperture 26 that is sized for receiving the tailfeathers 102 of the bird 100. The top surface 22 of the back section 18 is longitudinally split from the top edge 24 to the aperture 26, forming a first tab 28 and a second tab 30. The tabs 28, 30 provide sufficient looseness of the bird diaper 10 to slip the bird 100 in the assembled bird diaper 10, as discussed below.

Figure 1:
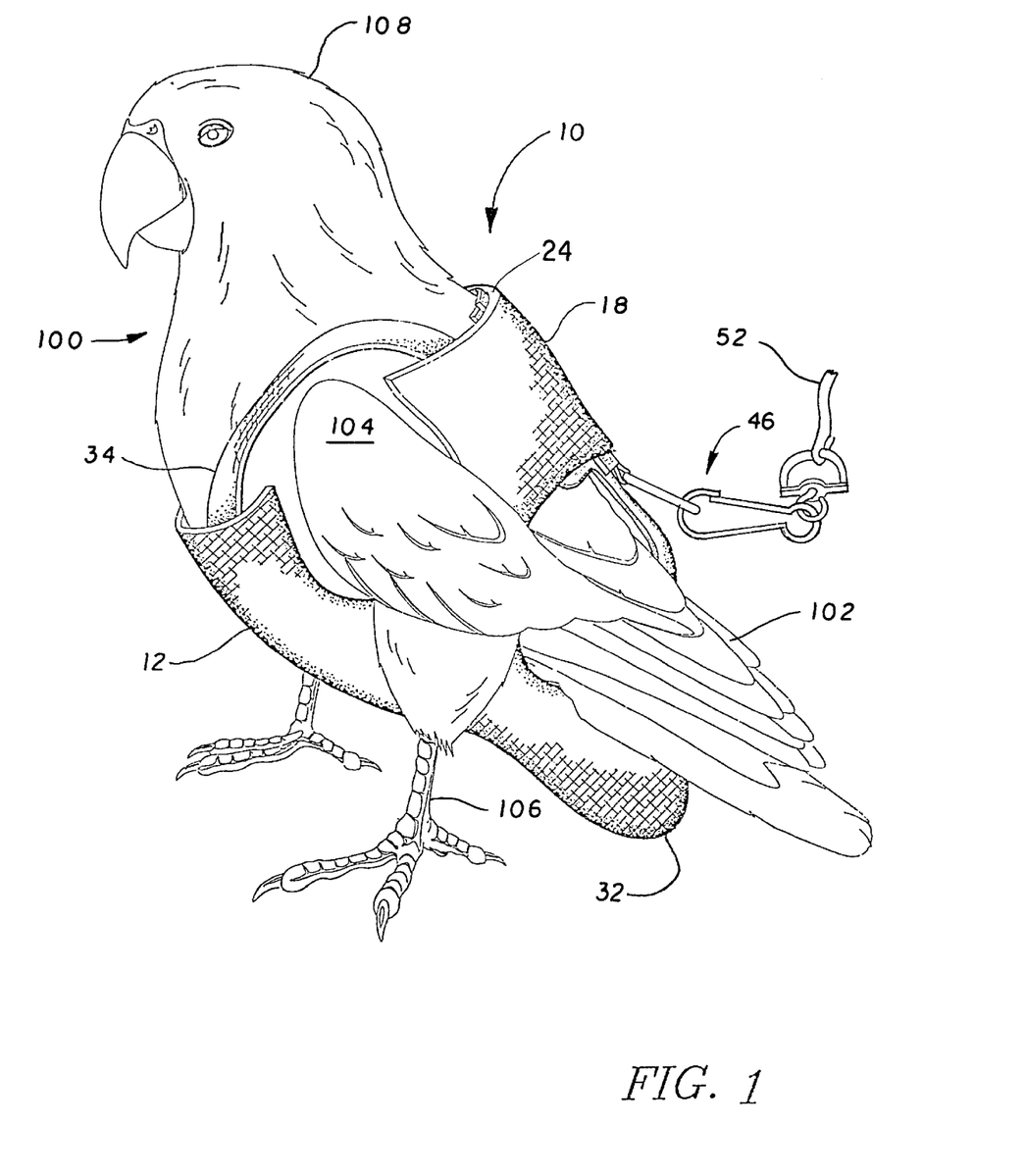
FIG. 1 is an environmental, side view of a bird diaper according to the present invention, as worn by a pet bird.

While the bird diaper 10 may be constructed from any number of pieces of material, the preferred embodiment of the bird diaper 10 comprises three pieces of stretchable material, as shown in FIG. 1. Referring to FIG. 2, the bird diaper 10 has a front piece of material 12 with a substantially rectangular top part 14. This top part 14 includes a top edge 54, a pair of sides 56 and a phantom bottom edge. The periphery of top part 14 is folded over and stitched. The sides 56 of top part 14 diverge into outward flanges 58 at the phantom bottom edge of the top part 14. At the tip of the flanges 58, the front piece 12 continue downward, forming an elongated rounded bottom 16.

Figure 3:
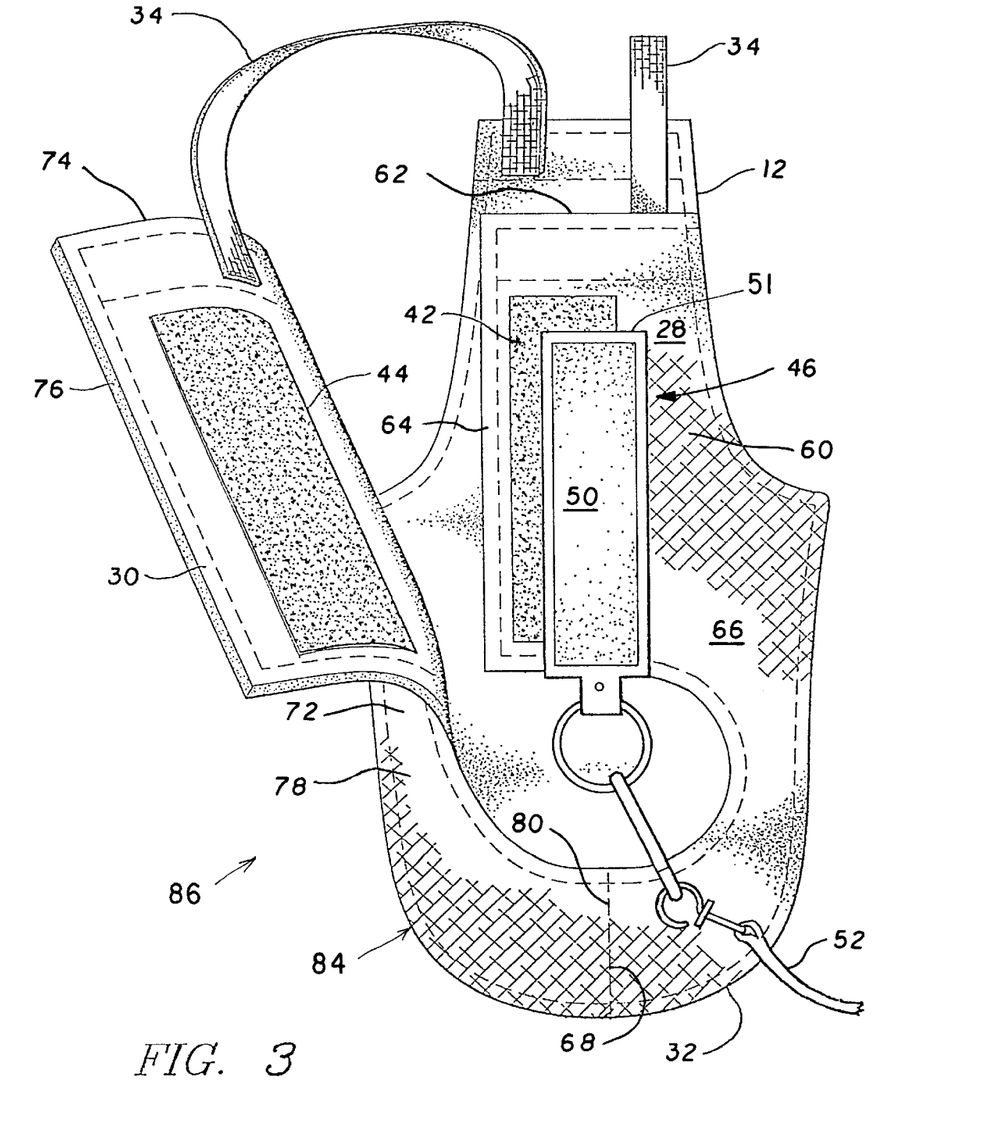
FIG. 3 is a rear view of the bird diaper according to the invention of FIG. 1, in an open position.

Two other pieces of stretchable material, a first back piece of material 60 and a second back piece of material 72, connect to form the back side 18 of the bird diaper 10, as illustrated in FIG. 3. The interconnection of the first back piece 60 and the second back piece 72 form a sub-assembly 84 which is substantially a mirror-image of the front piece 12. The formation of the sub-assembly 84 is discussed in detail below.

The first back piece 60 has an upper portion and a lower portion. The upper portion of the first back piece 60 is substantially rectangular and is referred to as a first tab 28. The first tab 28 has a top edge 62, a phantom bottom edge and a pair of sides 64. The periphery of first tab 28 is folded over once and stitched.

The lower portion of the first back piece 60 is substantially semi-circular and curves in a downward clockwise direction from the phantom bottom edge of the first tab 28. The lower portion is referred to as the first semi-circular bottom, or first bottom 66. The semi-circular portion of the first bottom 66 ends at a first terminal end 68. The first terminal end 68 is substantially parallel to the sides 64 of the first tab 28. The inner periphery of first bottom 66 is folded over once and stitched.

The second back piece of material 72 has a shape similar to the first back piece 60, but is substantially the mirror image thereof. The second back piece 72 has an upper portion and a lower portion. The upper portion of the second back piece 72 is substantially rectangular and is referred to as a second tab 30. The second tab 30 has a top edge 74, a phantom bottom edge and a pair of sides 76. The periphery of second tab 30 is folded over once and stitched.

The lower portion of the second back piece 72 is substantially semi-circular and curves in a downward counterclockwise direction from the phantom bottom edge of the second tab 30. The lower portion is referred to as the second semi-circular bottom, or second bottom 78. The semi-circular portion of the second bottom 78 ends at a second terminal end 80. The second terminal end 80 is substantially parallel to the sides 76 of the second tab 30. The inner periphery of second bottom 78 is folded over once and stitched.

Referring again to the sub-assembly 84 of the bird diaper 10, the first back piece 60 is connected to the second back piece 72 at the terminal ends 68 and 80 of the first bottom 66 and the second bottom 78. The first and second bottoms parts 66 and 78 are preferably connected to each other by stitching. As mentioned above, the sub-assembly 84 is substantially a mirror-image of the front piece 12.

Further assembly of bird diaper 10 involves connecting the elongated rounded bottom 16 of the front piece 12 to the first bottom 66 and the second bottom 78 of the first back piece 60 and the second back piece 72, respectively. Inside stitching connects both back bottom pieces 60 and 72 to the elongated rounded bottom 16 of the front piece 12, forming an enclosed pouch 32. The interconnection of the first piece 12 with the sub-assembly 84 forms an assembly 86.

The bird diaper 10 has a fastening means for fastening the first tab 28 to the second tab 30. The fastening means can be of any variety, such as a button/button-hole combination, a zipper, etc. It is preferred that the fastening means is a hook and loop fastener. A first hook fastener 42 is affixed to the first tab 28 and a first loop fastener 44 is affixed to the second tab 30. The first hook fastener 42 is removably attached to the first loop fastener 44, forming the aperture 26 in which the tailfeathers 102 of the bird 100 pass through.

The bird diaper 10 has pair of connectors 34, each of which includes two ends. One end of each connector 34 is connected to the top surface 14. The other end of one connector 34 is connected to the first tab 28 and the other end of the other connector 34 is connected to the second tab 30. The connectors 34 are preferably made of an elastomeric material.

A first orifice 36, a second orifice 38 and a third orifice 40 are formed by the sides 56 of the top surface 14, the outermost side 64 of the first tab 28, the outermost side 76 of the second tab 30 and the connectors 34. The outermost sides 64 and 76 are the sides in registry with the sides 56 of the top surface 14 when the back section 18 overlays the front section 12. The first and second orifice 36 and 38 are sized for receiving the wings 104 and legs 106 of the bird 100. The third orifice 40 is sized for receiving the head 108 of the bird 100.

Upon application of the bird diaper 10, a pet bird owner separates the first hook and loop fastener components 42 and 44 and spreads apart the first tab 28 and the second tab 30. The pet owner then places bird diaper 10 in between the legs 106 of the pet bird 100, with the inner surface of front piece 12 facing the breast of the bird. The pet owner inserts both legs 106 of the bird 100 into the first orifice 36 and the second orifice 38. Stretching the connectors 34 over the wings 104 of the bird pulls bird diaper 10 closer to the bird, so that the inner surface of front piece 12 contacts the breast of the bird. The pet bird owner aligns pouch 32 under the excretory organs of the pet bird, to receive and to contain both feces and urine. The elongated shape of pouch 32 prevents excrement from touching the bird. After positioning pouch 32, the tailfeathers of the bird exit through the aperture 26.

To secure bird diaper 10 on the body of the pet bird, the bird owner fastens the first hook fastener 42 to the first loop fastener 44. FIG. 1 shows bird diaper 10 in place on a pet bird.

Figure 6:
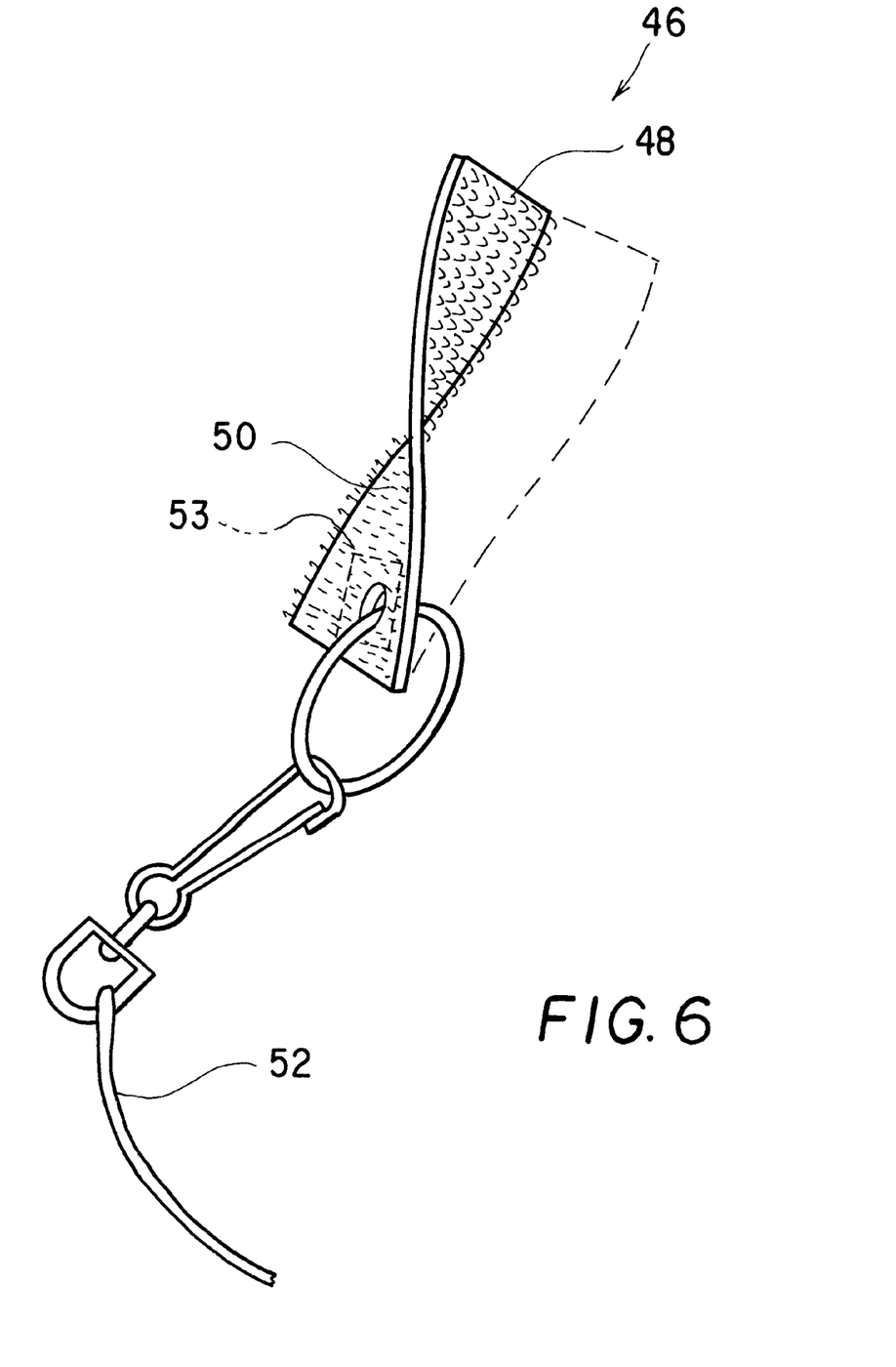
FIG. 6 is a perspective view showing a part of the leash illustrated in FIG. 5.
Figure 7:
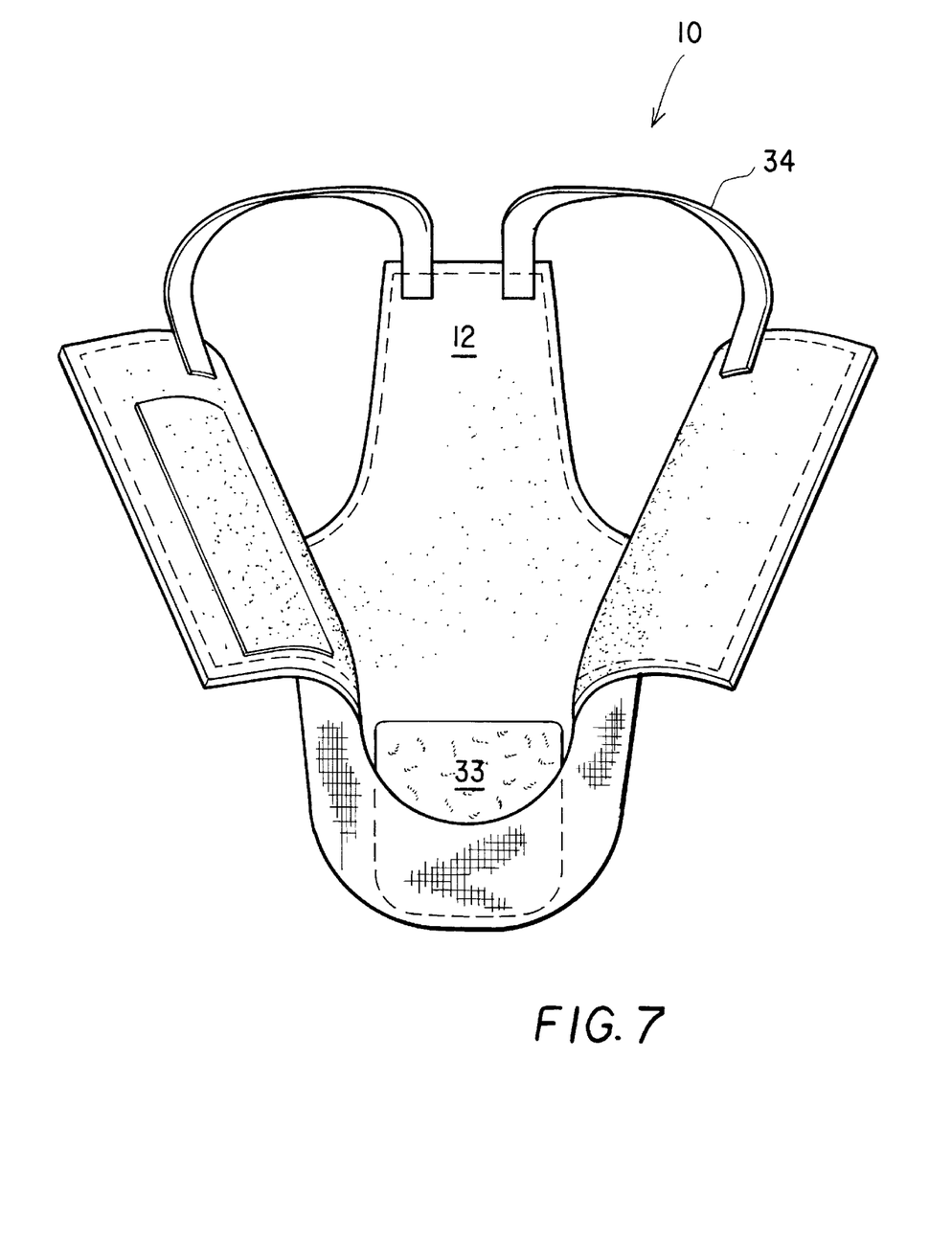
FIG. 7 is a rear view of the bird diaper, shown completely open.

In addition to the elements described above, the bird diaper 10 has a leash 46 removably attached to the back section 18 or sub-assembly 84 of the preferred embodiment. Referring to FIG. 6, the leash comprises a second loop fastener 48 and a second hook fastener 50. Both the second loop fastener 48 and the second hook fastener 50 include a back surface. The fasteners 48 and 50 are attached to each other at their respective back surfaces, forming an assembly.

A cord 52 is connected to the assembly. A reinforcing member 53 is attached to each of the back surfaces of the second loop fastener 48 and the second hook fastener 50 at the point where the cord 52 is connected to the assembly.

Figure 5:
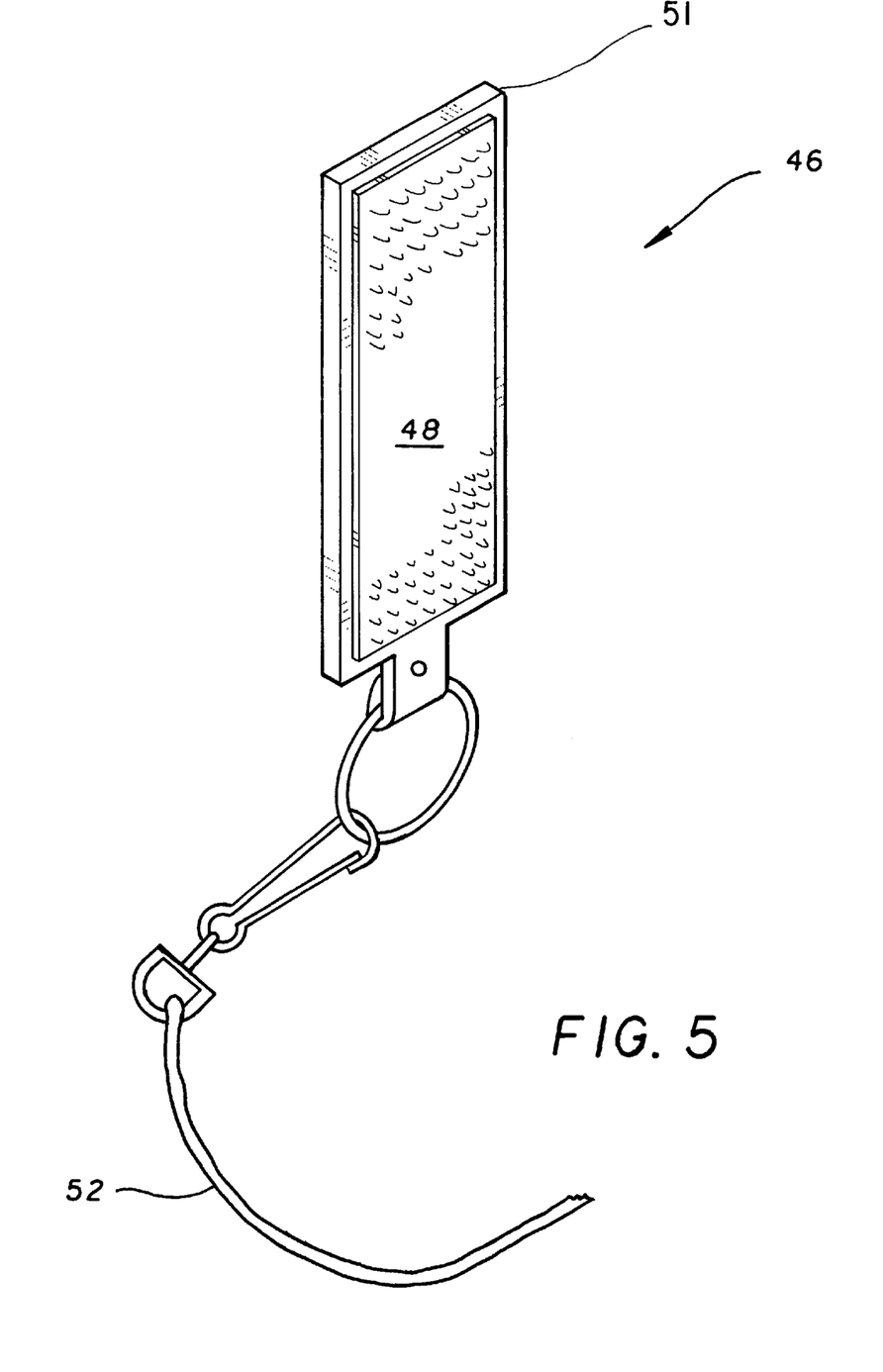
FIG. 5 is an enlarged scale perspective side view of the leash.

Referring to FIG. 5, the leash further comprises a planar member 51 attached to each of the back surfaces of the second loop fastener 48 and the second hook fastener 50. Also, a second loop fastener 48 is affixed to the first surface and a second hook fastener 50 is affixed to the second surface.

The leash allows the owner of the bird 100 to limit the bird's 100 area of flight. This is accomplished by placing the assembly in between the first tab 28 and the second tab 30. The owner then engages the first hook fastener 42 with the second loop fastener 48 and the second hook fastener 50 with the first loop fastener 44. As the bird 100 is flying, the length of the cord 52 limits the length of the bird's 100 flight path, thus limiting the area of flight.

The bird diaper 10 may be fabricated from a stretchable, lightweight material like SPANDEX or LYCRA. The stretchable, lightweight material allows absorption of bird excrement to prevent leaks and facilitating easy cleaning using soap and water. The bird diaper 10 can incorporate decorative designs and bright colors. Furthermore, the non-restrictive design of the bird diaper 10 allows the bird's body and wings to move freely.

In addition, the bird diaper 10 can be moistened before application to cool the pet bird 100 during summer months. Alternatively, the bird diaper 10 can be utilized to keep the pet bird 100 warm during winter months. To accommodate different types of pet birds 100, the bird diaper 10 would be available in different sizes.

It is to be understood that the present invention is not limited to the embodiments described above, but encompasses any and all embodiments within the scope of the following claims.

We claim:

1. A sanitary apparatus for use with a bird comprising:

a front section of fabric including a top surface and a bottom surface;

a back section of fabric connected to said front section of fabric, said back section of fabric including a bottom surface and a top surface having a top edge, said bottom surface of said back section of fabric containing means defining an aperture therethrough, said aperture being sized for receiving the tailfeathers of the bird, said top surface of said back section of fabric being longitudinally split from said top edge of said top surface to said aperture to form a first tab and a second tab;

fastening means for fastening said first tab to said second tab;

a pouch formed from the interconnection of said front section of fabric and said back section of fabric, said pouch being suited for receiving fecal matter therein; and a pair of connectors, each of said connectors includes two ends, wherein one end of each of said connectors is connected to the top surface of said front section of fabric and the other ends of said connectors are connected to the top surface of said back section defining a first orifice, a second orifice, and a third orifice, said first and second orifice being suited for receiving the wings and legs of the bird and said third orifice being suited for receiving the head of the bird.

2. The sanitary apparatus according to claim 1, wherein said fastening means comprises:

a first hook fastener affixed to said first tab; and a first loop fastener affixed to said second tab;

whereby said hook fastener is removably attached to said loop fastener.

3. The sanitary apparatus according to claim 2, further comprising:

a leash removably attached to said back section of fabric.

4. The sanitary apparatus according to claim 3, wherein said leash comprises:

a second loop fastener including a back surface; and a second hook fastener including a back surface, wherein said back surface of said second hook fastener is attached to said back surface of said second loop fastener forming an assembly;

wherein said assembly is inserted between said first tab and said second tab, and said second loop fastener is removably attached to said first hook fastener and said second hook fastener is removably attached to first loop fastener;

a cord connected to said assembly; and a reinforcing member attached to said back surfaces of said second hook fastener and said second loop fastener, said reinforcing member being positioned at the point where said cord is connected to said assembly.

5. The sanitary apparatus according to claim 4, further comprising a planer member attached to each of said back surfaces of said second hook fastener and second loop fastener.

6. The sanitary apparatus according to claim 1, further comprising an absorbent pad attached to said pouch.

7. The sanitary apparatus according to claim 1, wherein said connectors are elastomeric straps.

8. The sanitary apparatus according to claim 1, wherein said front section of fabric and said back section of fabric are made of a stretchable and absorbent material.

9. The sanitary apparatus according to claim 1, wherein said pouch is sized and configured to prevent excrement within said pouch from contacting the bird.

10. A sanitary apparatus for use with a bird, said sanitary apparatus comprising:

a front piece of material including: a substantially rectangular-shaped top having a top edge, a phantom bottom edge and a pair of sides; a pair of outwardly diverging flanges connected to said sides of the rectangular-shaped top at said phantom bottom edge; and an elongated rounded bottom connected to said flanges and said phantom bottom edge;

a first back piece of material including: a first tab which is substantially rectangular in shape, said first tab has a top edge, a phantom bottom edge and a pair of sides; and a first semi-circular bottom connected to said phantom bottom edge of said first back piece, said first bottom has a first terminal end, whereby said first terminal end is substantially parallel to said sides of said first tab;

a second back piece of material including: a second tab which is substantially rectangular in shape, said second tab has a top edge, a phantom bottom edge and a pair of sides; and a second semi-circular bottom connected to said phantom bottom edge of said second back piece, said second bottom has a second terminal end, whereby said second terminal end is substantially parallel to said sides of said second tab;

whereby said first back piece of material is connected to said second back piece of material at each of said terminal ends, wherein the interconnection of said first back piece of material and said second back piece of material forms a sub-assembly, said sub-assembly is substantially a mirror image of said front piece of material;

whereby said sub-assembly is connected to said elongated rounded bottom of said front piece of material, wherein the interconnection of said assembly and said elongated rounded bottom forms an assembly;

a fastening means for fastening said first tab to said second tab;

whereby fastening said first tab to said second tab forms an aperture, said aperture being sized for receiving the tailfeathers of the bird; and a pair of connectors, each of said connectors includes two ends, wherein one end of each of said connectors is connected to said rectangular-shaped top, the other end of one of said connectors is connected to said first tab, and the other end of the other of said connectors is connected to said second tab, defining a first orifice, a second orifice, and a third orifice, said first and second orifice being suited for receiving the wings and legs of the bird and said third orifice being suited for receiving the head of the bird.

11. The sanitary apparatus as defined in claim 10, wherein said assembly of said pieces of material forms an elongated pouch for receiving and containing excrement discharged by a bird.

12. The sanitary apparatus according to claim 10, wherein said pouch is sized and configured to prevent excrement within said pouch from contacting the bird.

13. The sanitary apparatus according to claim 10, further comprising an absorbent pad attached to said pouch.

14. The sanitary apparatus as defined in claim 10, wherein said connectors are elastomeric straps.

15. The sanitary apparatus as defined in claim 10, wherein said front piece of material, said first back piece of material and said second back piece of material are made of a stretchable and absorbent fabric.

16. The sanitary apparatus according to claim 10, wherein said fastening means comprises:

a first hook fastener affixed to said first tab; and a first loop fastener affixed to said second tab;

whereby said first hook fastener is removably attached to said first loop fastener.

17. The sanitary apparatus according to claim 16, further comprising:

a leash removably attached to said assembly, said leash including:

a second loop fastener including a back surface; and a second hook fastener including a back surface, wherein said back surface of said second hook fastener is attached to said back surface of said second loop fastener forming an assembly;

wherein said assembly is inserted between said first tab and said second tab, and said second loop fastener is removably attached to said first hook fastener and said second hook fastener is removably attached to first loop fastener;

a cord connected to said assembly; and a reinforcing member attached to said back surfaces of said second hook fastener and said second loop fastener, said reinforcing member being positioned at the point where said cord is connected to said assembly.

18. The sanitary apparatus according to claim 17, further comprising a planer member attached to each of said back surfaces of said second hook fastener and second loop fastener.

* * * * *